Sept. 1, 1942.  L. S. MALM ET AL  2,294,566
MEASURING INSTRUMENT
Filed Dec. 19, 1941

INVENTORS
LELAND S. MALM
JOHN F. ONETO
BY Taylor and Lassagne
ATTORNEYS

Patented Sept. 1, 1942

2,294,566

UNITED STATES PATENT OFFICE 2,294,566

MEASURING INSTRUMENT

Leland S. Malm and John F. Oneto,
San Francisco, Calif.

Application December 19, 1941, Serial No. 423,651

8 Claims. (Cl. 33—141)

This invention relates to measuring instruments and particularly devices which will be found useful in scaling or estimating drawings, blue prints, maps, and the like.

One of the principal objects of this invention is to provide a measuring or scaling device which will be portable and useful in conjunction with conventional electro-magnetic counting systems.

Another object of the invention is to provide a device of the character described which will be comparatively simple in construction and yet readily adaptable to the various scales employed in the making of drawings, maps, and the like.

Other objects of the invention will become apparent as this specification proceeds.

In the drawing forming a part hereof:

Figure 1:
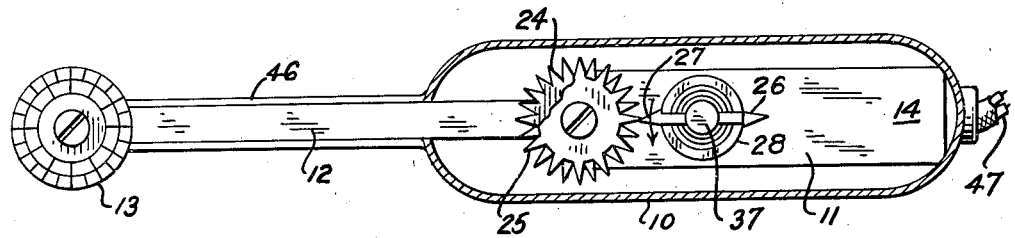
Figure 1 is a longitudinal vertical section through the device embodying the invention.

In terms of general inclusion, the preferred form of the invention illustrated herein utilizes a rotatable member or traction wheel which is adapted to be moved over the part of the drawing or map to be scaled, which traction wheel has an operative connection through a train of gears to a switch means adapted to make and break a circuit with an electro-magnetic counting system employed to record the lineal measurement of the drawing or map or objects depicted thereon.

In the form illustrated in the accompanying drawing, we provide an elongated, substantially cylindrical housing 10 for the switch and actuating mechanism therefor, which housing also serves as a handle. A plate extending longitudinally within the housing 10 serves as a mount 11 for the actuating mechanism about to be described and a reduced portion of the plate extends through one end of the housing 10 in the form of an arm 12 to support a rotatable traction wheel 13.

Since it is general practice for drawings to be scaled on the order of one-quarter or one-eighth of an inch to the foot, the preferred form of our invention includes a traction wheel 13 having a scale 15 denoting quarters and halves of an inch, as a means of visibly indicating distances traversed by the wheel.

The wheel 13 is rotatably mounted at one side of the end of the arm 12 on a shaft 16 journaled therein (see Figure 2); and on the opposite end of the shaft 16, we provide a bevel gear 17. Gear 17 meshes with a similar bevel gear 18 on shaft 19 journaled in posts 20 on arm 12; and a third bevel gear 21, at the opposite end of shaft 19 meshes with a bevel gear 22. Gear 22 is fixed on a shaft 23 journaled through plate 11 and carrying on its oposite end a pair of star wheels or ratchets 24 and 25. It is through this train of gears that rotative movement of traction wheel 13 is transmitted eventually to a conventional micro switch, indicated by the numeral 14, to make and break the circuit including a conventional electro-magnetic counting system.

The star wheels or ratchets 24 and 25 are fixed on shaft 23 and, according to the number and spacing of the teeth carried thereby, may be selectively used to trip the switch means employed according to the scale of the drawing to be checked; i. e., one-eighth or one-quarter inch to the foot, respectively. While we have illustrated only two such ratchet wheels, it will be understood that, if need arises, additional wheels of this character may be added with corresponding pawls to adapt the device for varying scales. A pair of pawls 26 and 27, oppositely arranged on the order of 180°, on a drum 28, are adapted to be selectively moved into the path of one or the other of ratchets 24 or 25. The drum 28 is slidably mounted on a pin 29 fixed on disc 30 bearing against plate 11. A shaft 31 fixed on the opposite face of disc 30, and in coaxial alignment with the pin 29 is journaled in plate 11.

Figure 3:
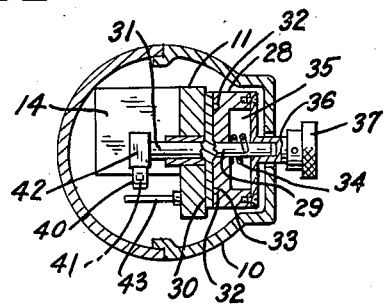
Figure 3 is a transverse sectional view of the device along the line 3—3 of Figure 2.

As will be noted from Figure 3 of the drawing, drum 28 and disc 30 are adapted to be united for conjoint rotative movement through the provision of pins 32 on the disc 30, oppositely arranged adjacent the periphery thereof on the order of 180°, and registering holes 33 in the inner face of the drum 28. A helical spring 34 within the chamber 35 of drum 28 and encircling pin 29, one end of which is anchored in said pin and the other end of which bears against the inner face of the drum 28, normally urges the drum into the above-described connection with disc 30. The outer face of drum 28 has an integral, axially arranged sleeve 36 projecting therefrom through the handle or housing 10 and a knurled knob 37 is fixed thereon to facilitate the selection between the ratchets 24 and 25 and the proper disposition of the pawls 26 and 27 in operative relation thereto. By pulling knob 37, the drum 28 may be disengaged from disc 30 against the tension of spring 34 and partially rotated to dispose pawl 27 in the path of ratchet 25 or pawl 26 in the path of ratchet 24 and when properly positioned, release of knob 37 will permit spring 34 to again urge drum 28 into engagement with disc 30 since pins 32 will enter registering the holes 33 to interlock the said elements.

Figure 4:
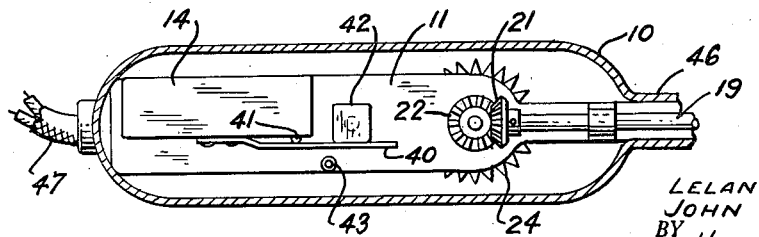
Figure 4 is a longitudinal section through the handle of the device taken along the line 4—4 of Figure 2.

The conventional micro-switch 14 is mounted on plate 11 and has a leaf spring contact 40 projecting therefrom parallel to the plate 11. (See Figure 4.) The switch illustrated is of the normally closed type wherein contact 40 bears against contact 41, and the opening of the switch actuates the electrical counting mechanism with which it is operatively connected. In the form of the invention illustrated, we employ a squared knob 42 fixed at the end of the shaft 31 to open the above-described contacts. Normally one of the flat sides of knob 42 rests upon the leaf spring 40, as indicated in Figure 4 of the drawing. When shaft 31 is partially rotated or rocked by the tripping of either pawl 26 or 27, the corners of squared knob 42 will act as an eccentric to urge leaf spring contact 40 away from contact 41 and open the circuit. When pawl 26 or 27 has slipped from the teeth of its corresponding ratchet, 24 or 25, respectively, the spring contact 40 will bear against the knob 42 and partially rotate or rock the shaft 31 to reset the pawl and at the same time again contact the member 41 to close the circuit. A stop pin 43 seated in plate 11 projects outwardly to limit the movement of spring contact 40 and hence prevent more than partial rotation of shaft 31.

It will be understood, of course, that knob 42, shaft 31, disc 30, and stop pin 43 are all made of nonconductor material as a means of insulating switch 25 from the remainder of the structure.

Figure 2:
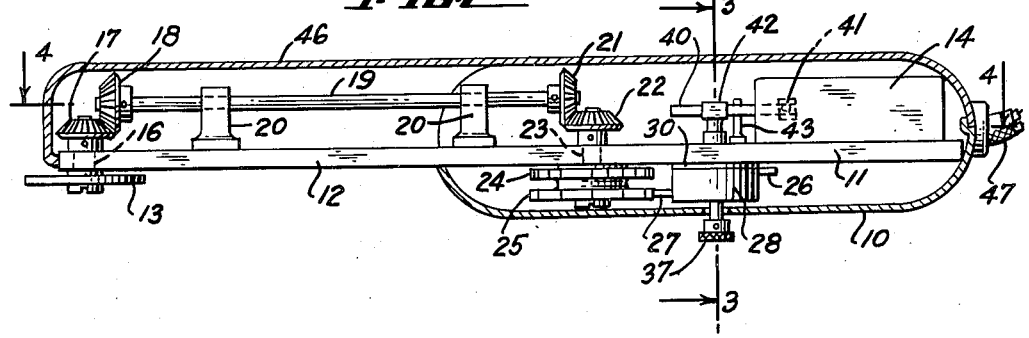
Figure 2 is a longitudinal horizontal section of the device forming the subject matter of Figure 1.

If desired, the device may be provided with a cover 46 for the gears 16 and 17 and the shaft 19 in the form shown in Figure 2. In addition to protecting the operating mechanism from foreign matter and preventing accidents through contact with the moving parts, such cover may be utilized to improve the appearance of the device and, at the same time, provide a structure fully enclosed save for the traction wheel 13 and the knob 37.

To summarize, the operation of the device is as follows:

The operator first determines the scale of the drawing or blueprint to be checked and then sets the instrument accordingly by manipulation of the knob 37. By withdrawing knob 37, drum 28 may be disengaged from disc 30; and upon rotating the knob through 180°, pawl 26 may be positioned to contact the teeth of ratchet 24 or pawl 27 to contact ratchet 25, according to whether the scale is one-eighth or one-quarter of an inch to the foot, respectively; and the knob 37 is then released. Spring 34 will then urge drum 28 into engagement with disc 30, thus interconnecting the elements whereby tripping of pawl 26 or 27 will rock shaft 31 to open the contacts 40 and 41.

Thus upon movement of traction wheel 13 over a given surface, the rotative movement thereof will be transmitted through the train of gears 16 and 17, the shaft 19, and gears 21 and 22 to the shaft 23 and thence by the ratchet 24 or 25 to pawl 26 or 27, by which a rocking motion will be imparted to shaft 31 to open contacts 40 and 41. The intermittent opening and closing of the micro switch 25 is transmitted to an electrical counting means through the conventional leads 47.

It will be appreciated that the device illustrated and described herein is but a preferred form of our invention and that it may take other forms without departing from the spirit of the invention as defined in the appended claims.

The invention claimed is:

1. In a measuring instrument the combination of a support, a traction wheel rotatably mounted on the support, a train of gears operatively connected to the traction wheel, a switch, contact means for the switch, and rockable means in engagement with the train of gears and actuated upon rotation of said traction wheel, said rockable means having an operative connection with said switch contact means.

2. In a measuring instrument the combination of a support, a traction wheel rotatably mounted on the support, a train of gears operatively connected to the traction wheel, a microswitch, contact means for the switch, a rockable shaft, means on the rockable shaft for actuating the switch contact means, and means for rocking the shaft actuated upon rotation of the traction wheel.

3. In a measuring instrument, a support, a traction wheel rotatably mounted on the support, a train of gears operatively connected to the traction wheel, a microswitch, contact means for the switch, a rockable shaft, means on the rockable shaft for actuating the switch contact means, a plurality of means for rocking the shaft actuated upon rotation of the traction wheel, each of said means being adapted to rock the shaft a different number of times for each rotation of the traction wheel, and means for rendering operative a selected one of the shaft rocking means.

4. In a measuring instrument, a support, a traction wheel rotatably mounted on the support, a train of gears operatively connected to the traction wheel, a microswitch, contact means for the switch, a rockable shaft, means on the rockable shaft for actuating the switch contact means, selectable means for rocking the shaft, each adapted to rock the shaft a different number of times per revolution, but all actuated upon rotation of the traction wheel, and means for selectively rendering operative one of the shaft rocking means.

5. In a measuring instrument, a support, a traction wheel rotatably mounted on the support, a train of gears operatively connected to the traction wheel, a microswitch, spring contact means for the switch, a rockable shaft, means on the rockable shaft for actuating the switch contact means, a rotatable shaft operatively connected with the train of gears, a plurality of means on the rotatable shaft each adapted to rock the rock shaft a different number of times per revolution of the traction wheel, and means for seletcively rendering operative one of the shaft rocking means.

6. In a measuring instrument, a support, a traction wheel rotatably mounted on the support, a train of gears operatively connected to the traction wheel, a microswitch, spring contact means for the switch, a rockable shaft, means on the rockable shaft for actuating the switch contact means, a rotatable shaft operatively connected with the train of gears, a star wheel on the rotatable shaft, and a pawl engageable with the star wheel operatively connected with said rockable shaft.

7. In a measuring instrument, a support, a traction wheel rotatably mounted on the support, a train of gears operatively connected to the traction wheel, a microswitch, spring contact means for the switch, a rockable shaft, means on the rockable shaft for actuating the switch contact means, a rotatable shaft operatively connected with the train of gears, a plurality of star wheels on the rotatable shaft each having a different number of teeth, and pawl means operatively connected to the rockable shaft selectively engageable with a particular one of the star wheels.

8. In a measuring instrument, a chambered handle member, a plate extending longitudinally within the handle, an arm extending from the handle, a traction wheel rotatably mounted on the arm, a train of gears supported partly on the arm and partly within the handle operatively connected with the traction wheel, a microswitch supported on the plate within the handle, spring contact means for the switch, a rockable shaft journaled in the plate, means on the rockable shaft for actuating the switch contact means, a rotatable shaft journaled in said plate, operatively connected to said train of gears, a plurality of star wheels fixed on the rotatable shaft each having a different number of teeth, a drum operatively connected to the rockable shaft, a plurality of pawls carried by said drum, and means for selectively positioning one of said pawls for engagement by one of said star wheels.

LELAND S. MALM.
JOHN F. ONETO.